Sept. 16, 1958  A. B. RAPPAPORT  2,852,101
AUTO-ROLLER DEVICE
Filed Aug. 24, 1955

INVENTOR.
AARON B. RAPPAPORT
BY

ATTORNEYS.

United States Patent Office 2,852,101
Patented Sept. 16, 1958

2,852,101

AUTO-ROLLER DEVICE

Aaron B. Rappaport, Bronx, N. Y.

Application August 24, 1955, Serial No. 530,233

4 Claims. (Cl. 188—4)

This invention relates to land vehicles and especially to anti-skid and traction increasing devices.

One of the objects of the invention is to counteract the skidding of a land vehicle and to facilitate extricating the same from snow or mud banks and the like.

In one aspect of the invention, a movable means can be mounted on the underside of a land vehicle, the movable means having transversely extending rollers rotatably mounted thereon ahead of the wheels of the vehicle. The movable support when lowered is arranged to permit the roller means to engage both the surface of the roadway and the forward surface of said wheels so that the rollers contacting the wheels will rotate in a direction opposite to that of the wheels. In addition, a second set of rollers can be mounted at the rear side of the wheels and arranged to be moved downwardly against the surface of the roadway, the second set of rollers rotating in the same direction as the wheels. Mechanical means, such as gear sectors can interconnect the rollers so as to enable simultaneous lowering or raising thereof by the operator.

These and other objects, advantages and features of the invention will become apparent from the following description and drawings which are merely exemplary.

Figure 1:
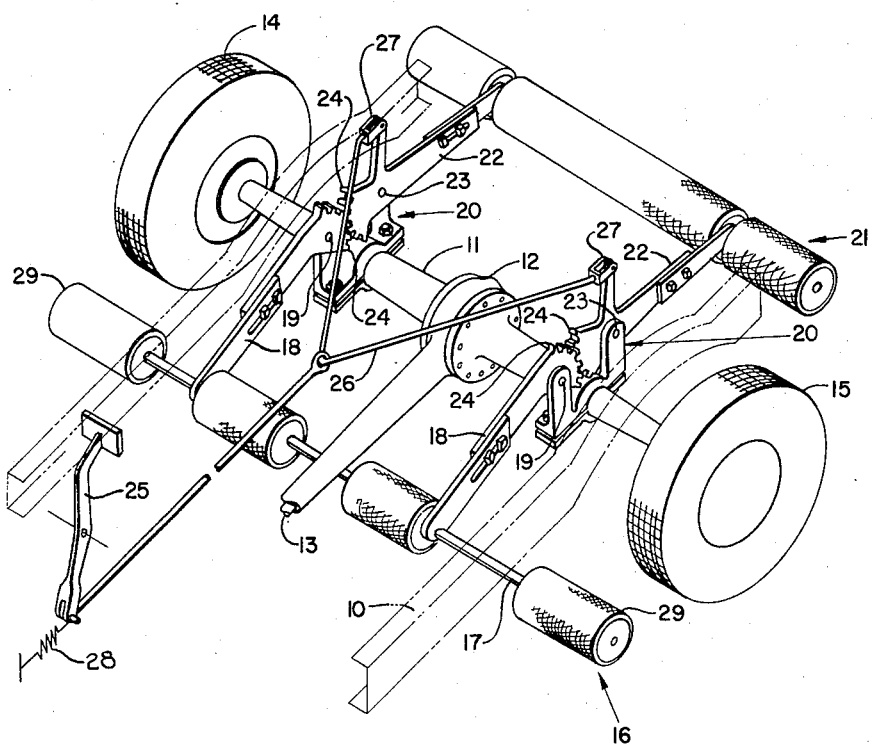
Fig. 1 is a fragmentary perspective view of a vehicle having the invention applied thereto.

Frame 10 of the vehicle may have axle 11 attached thereto in a conventional manner, differential 12 being provided for transmitting power from shaft 13 to wheels 14, 15. The forward or first roller assembly 16 is mounted on shaft 17, shaft 17 being oscillatably carried on arms 18, arms 18 being pivoted at 19, 19 to bracket means 20 fastened to axle 11. The roller assembly may comprise a plurality of rollers extending along the shaft.

Figure 2:
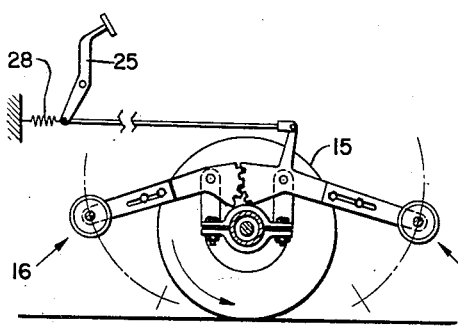
Fig. 2 is a fragmentary schematic elevation of Fig. 1 showing the rollers in an upper or raised position.

The rear roller assembly 21 is oscillatably carried by arms 22 which are pivoted at 23, 23 to bracket means 20. In the form shown, arms 18 and 22 may have interengaging gear teeth 24 thereon. An operating pedal or means 25 can be connected by any suitable way, such as rod or wire 26, to a bell crank extension on one of the arms, such as to arms 22 at pivot 27. Spring or suitable means 28 can be provided for normally urging the rollers in their inoperative or upper position as seen in Fig. 2. The rear roller assembly also may be composed of a plurality of rollers.

Figure 3:
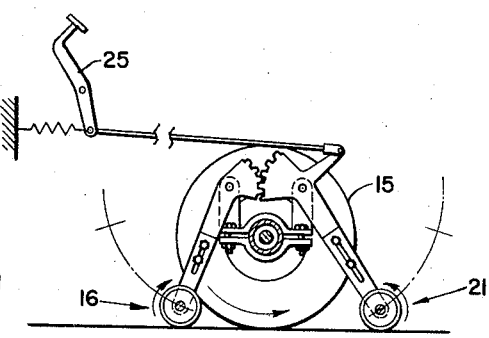
Fig. 3 is similar to Fig. 2 with the exception that the rollers have been lowered to their operative position in contact with the roadway.

Upon operation of operating pedal 25, the roller assemblies will be simultaneously lowered from the position shown in Fig. 2 to that shown in Fig. 3 wherein some of the forward roller means will contact their respective wheels and will rotate in a direction opposite to said wheels. For example, if the wheels are rotating in a counterclockwise direction, rollers of assembly 29 in contact with the wheels will rotate clockwise and the rear rollers 21 will rotate counterclockwise. The rollers also could be operated by a suitable electric motor (not shown) operated by a switch.

Merely by way of example, the rollers may be light weight metal cylinders of six-inch diameter turning on shafts of one and one-half inch diameter. The length of roller assembly 16 may be sixty-four inches and assembly 21 may be forty inches, such depending upon the transverse distance between the wheels. Inasmuch as the rollers turn on the shaft, if the brakes should lock the wheels, the interior rollers of assembly 16 will continue rotation. The cylinders can be covered with three-inch groove rubber.

The arrangement when raised and lowered by an electric motor could be controlled by using the power from the stop-light circuit to activate the motor. In such a case, operation of the brake would cause the electric motor to lower the rollers.

It should be apparent that if desired, only the front roller assembly can be used, and that the details of construction can be varied without departing from the spirit of the invention except as defined in the appended claims.

What is claimed is:

1. A safety device for a land vehicle comprising movable support means adapted for mounting on the underside of said vehicle, said support means including a pair of shaft members located substantially parallel to an axle of said vehicle and adapted to be raised and lowered, one of said shaft members being located in front of said axle and the other of said shaft members being located in back of said axle; roller means mounted for rotation on each of said shaft members and adapted to engage the surface of the roadway when said shaft members are in lowered position, the roller means on said forward shaft member also engaging the forward surface of at least one of the wheels of said vehicle mounted on said axle; and operating means connected to said support means for raising and lowering said shaft members simultaneously.

2. A safety device for a land vehicle comprising movable support means adapted for mounting on the underside of said vehicle, said support means including a pair of shaft members located substantially parallel to an axle of said vehicle and adapted to be raised and lowered, one of said shaft members being located in front of said axle and the other of said shaft members being located in back of said axle; a plurality of rollers mounted for rotation on each of said shaft members and adapted to engage the surface of the roadway when said shaft members are in a lowered position, at least one of said rollers on the front shaft member also engaging the forward surface of a wheel of said vehicle mounted on said axle when said front shaft member is in said lowered position; and operating means connected to said support means for raising and lowering said shaft members simultaneously.

3. A safety device for a land vehicle comprising movable support means adapted for mounting on the underside of said vehicle, said support means including a pair of shaft members located substantially parallel to an axle of said vehicle and adapted to be raised and lowered, one of said shaft members being located in front of said axle and the other of said shaft members being located in back of said axle; a plurality of rollers mounted for rotation on each of said shaft members and adapted to engage the surface of the roadway when said shaft members are in a lowered position, two of said rollers on said front shaft member also respectively engaging the forward surfaces of the wheels of said vehicle mounted on said axle, said two rollers providing a braking effect on the forward motion of the vehicle and the remaining rollers providing anti-skid protection to prevent substantial lateral motion of the vehicle; and operating means connected to said support means for raising and lowering said shaft members simultaneously.

4. A safety device for a land vehicle as set forth in claim 3, and wherein the said operating means comprises a manually operated lever mounted on the chassis of said vehicle adjacent the driver's seat and wherein said support means further includes a pair of pivoted levers for each of said shaft members connected at their outer ends to said shaft members and having sector gears formed on their inner ends, the sector gears of the related levers for the front and rear shaft members being in meshing engagement, and means responsive to the movement of said manually operated lever for causing one of said shaft member levers to rotate about its pivot thereby causing simultaneous movement of the other of said shaft member levers.

References Cited in the file of this patent

UNITED STATES PATENTS

| | | |
|---|---|---|
| 1,636,997 | Helmling | July 26, 1927 |
| 2,184,664 | Ehret | Dec. 26, 1939 |
| 2,228,631 | Kuiper | Jan. 14, 1941 |
| 2,365,557 | Keith | Dec. 19, 1944 |
| 2,494,039 | Feather | Jan. 10, 1950 |
| 2,539,538 | Hayes | Jan. 30, 1951 |
| 2,650,679 | Durkin | Sept. 1, 1953 |
| 2,714,933 | Harris | Aug. 9, 1955 |
| 2,778,181 | Gray | Jan. 22, 1957 |

FOREIGN PATENTS

| | | |
|---|---|---|
| 709,798 | Canada | June 2, 1954 |
| 564,745 | Germany | Nov. 22, 1932 |